US010914592B2

(12) United States Patent
Wood et al.

(10) Patent No.: US 10,914,592 B2
(45) Date of Patent: Feb. 9, 2021

(54) NAVIGATION IN AN ESTABLISHMENT SITE FOR A USER USING A MOBILE ELECTRONIC DEVICE

(71) Applicant: INTERNATIONAL BUSINESS MACHINES CORPORATION, Armonk, NY (US)

(72) Inventors: John J. Wood, St. Albans (GB); Giacomo G. Chiarella, Eastleigh (GB); Eunjin Lee, Eastleigh (GB); Daniel T. Cunnington, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 197 days.

(21) Appl. No.: 16/131,319

(22) Filed: Sep. 14, 2018

(65) Prior Publication Data
US 2020/0088523 A1    Mar. 19, 2020

(51) Int. Cl.
*G01C 21/20*   (2006.01)
*G06N 5/04*   (2006.01)

(52) U.S. Cl.
CPC .......... *G01C 21/206* (2013.01); *G06N 5/048* (2013.01)

(58) Field of Classification Search
CPC .............................. G01C 21/206; G06N 5/048
USPC ....................................................... 701/423
See application file for complete search history.

(56) References Cited

U.S. PATENT DOCUMENTS

| 8,965,398 B2 | 2/2015 | Zhu et al. |
| 2011/0285591 A1 | 11/2011 | Wong |
| 2013/0310081 A1 | 11/2013 | Chu |
| 2018/0067187 A1 | 3/2018 | Oh et al. |

OTHER PUBLICATIONS

Gu et al., "A Survey of Indoor Positioning Systems for Wireless Personal Networks", IEEE Communications Surveys & Tutorials, vol. 11, No. 1, pp. 13-32, First Quarter 2009.
Hu, "Wi-Fi Based Indoor Positioning System Using Smartphones", Thesis Statement, School of Mathematical and Geospatial Sciences, College of Science, Engineering and Health, Royal Melbourne Institute of Technology (RMIT) University, Nov. 2013, 91 pages.
IBM, "Presence Insights: Customer insights everywhere", https://www-01.ibm.com/common/ssi/cgi-bin/ssialias?htmlfid=ZZJ12364USEN, accessed Sep. 6, 2018, 1 page.
(Continued)

*Primary Examiner* — Brian P Sweeney
(74) *Attorney, Agent, or Firm* — Kenneth Han

(57) ABSTRACT

A method, system and computer program product for navigation in an establishment site for a first user using a first mobile electronic device are provided. The embodiment may include scanning an area around a current location of the first user to identify a set of second mobile electronic devices. The embodiment may also include referencing one or more resources for: identifying a set of second users for each of the set of second mobile electronic devices; analyzing schedules of the set of second users to identify expected current locations of each of the set of second users in an establishment site; and identifying the current location of the first user relative to the expected current locations of at least some of the set of second users by referencing a map of the establishment site. The embodiment may further include receiving notification of a position of the current location.

20 Claims, 8 Drawing Sheets

(56) References Cited

OTHER PUBLICATIONS

Mell et al., "The NIST Definition of Cloud Computing," National Institute of Standards and Technology, Sep. 2011, p. 1-3, Special Publication 800-145.

Petrou, et al., "Demonstration Abstract: Crowdsourced Indoor Localization and Navigation With Anyplace", IPSN-14 Proceedings of the 13th International Symposium on Information Processing in Sensor Networks, Apr. 15-17, 2014, Berlin, Germany, IEEE, pp. 331-332.

ShopperVista, "About ShopperVista: insight into the attitudes and behaviours of British grocery shoppers", https://shoppervista.igd.com/about, Copyright The Institute of Grocery Distribution and IGD Services, accessed Sep. 6, 2018, 4 pages.

Spirit, "Indoor Positioning for Smartphones", http://www.indoorspirit.com/spirit_navigation_ips.html, accessed Sep. 5, 2018, 2 pages.

The Nielsen Company, "Shopper Experience | Understand Your Shoppers", http://www.nielsen.com/uk/en/solutions/shopper-experience.html, accessed Aug. 28, 2018, 4 pages.

Wikipedia, "Indoor positioning system", https://en.wikipedia.org/wiki/Indoor_positioning_system, accessed Aug. 28, 2018, 12 pages.

NAVIGATION IN AN ESTABLISHMENT SITE FOR A USER USING A MOBILE ELECTRONIC DEVICE

BACKGROUND

The present invention relates to navigation for a user using a mobile electronic device, and more specifically, navigation in an establishment site.

Indoor positioning systems (IPS) require a significant amount of hardware to be deployed, specifically Bluetooth® beacons (Bluetooth and all Bluetooth-related trademarks and logos are trademarks or registered trademarks of BLUETOOTH SIG, Inc. and/or its affiliates) and Wi-Fi® routers (Wi-Fi and all Wi-Fi-related trademarks and logos are trademarks or registered trademarks of Wi-Fi Alliance and/or its affiliates) to allow the trilateration of a user's position. Deploying an IPS on a large site, such as a large corporate enterprise site, can be cumbersome and cost prohibitive.

SUMMARY

According to one embodiment, a method, system and computer program product for navigation in an establishment site for a first user using a first mobile electronic device are provided. The embodiment may include canning an area around a current location of the first user to identify a set of second mobile electronic devices. The embodiment may also include referencing one or more resources for: identifying a set of second users for each of the set of second mobile electronic devices; analyzing schedules of the set of second users to identify expected current locations of each of the set of second users in an establishment site; and identifying the current location of the first user relative to the expected current locations of at least some of the set of second users by referencing a map of the establishment site. The embodiment may further include receiving notification of a position of the current location in the establishment site.

According to another aspect of the present invention there is provided a computer-implemented method for navigation in an establishment site for a first user using a first mobile electronic device by carrying out a method at a remote server comprising: providing an application to the first mobile electronic device of a first user to carry out scanning of an area around a current location of the first user to identify a set of second mobile electronic devices; identifying a set of second users for the set of second mobile electronic devices from a resource; analyzing schedules of the set of second users from a scheduling resource to identify expected current locations of each of the set of second users in an establishment site; identifying the current location of the first user relative to the expected current locations of at least some of the set of second users by referencing a map of the establishment site; and providing notification of a position of the current location in the establishment site.

According to another aspect of the present invention there is provided a system for navigation in an establishment site for a first user using a first mobile electronic device, the first mobile electronic device comprising: a processor and a memory configured to provide computer program instructions to the processor to execute the function of components; a scanning component for scanning an area around a current location of the first user to identify a set of second mobile electronic devices; a referencing component for referencing one or more resources for: identifying a set of second users for the set of second mobile electronic devices; analyzing schedules of the set of second users to identify expected current locations of each of the set of second users in an establishment site; and identifying the current location of the first user relative to the expected current locations of at least some of the set of second users by referencing a map of the establishment site; and a position component for receiving notification of a position of the current location in the establishment site.

According to a further aspect of the present invention there is provided a computer program product for navigation in an establishment site for a first user using a first mobile electronic device, the computer program product comprising a computer readable storage medium having program instructions embodied therewith, the program instructions executable by a processor to cause the processor to: scan, by the first mobile electronic device, an area around a current location of the first user to identify a set of second mobile electronic devices; reference one or more resources for: identifying a set of second users for each of the set of second mobile electronic devices; analyzing schedules of the set of second users to identify expected current locations of each of the set of second users in an establishment site; and identifying the current location of the first user relative to the expected current locations of at least some of the set of second users by referencing a map of the establishment site; and receive notification of a position of the current location in the establishment site.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A method and system of indoor navigation are described for a user using a mobile electronic device. The method and system use other user's mobile electronic devices as beacons to determine the user's position. Calendar or scheduling data is used to map the other users to known locations in an indoor establishment from which the user's position can be determined.

The method scans for other user's mobile electronic devices nearby and uses them as dynamic beacons assigning positions on a site map using information about the expected temporal location of a device on the map.

This method is applicable to locations in an establishment site. An establishment site may be a large corporate office, a retail park, an educational environment, or other establishment in which there are registered users whose details are provided on a database including scheduling information for the users. In a corporate environment, employees may be registered in a database including scheduling capabilities for meetings and other events. In a retail environment such as a shopping mall, shop employees and other staff may be registered in a database with their working shift schedules and locations. Similarly, students in a university campus may be registered on a database with their lectures and tutorials and locations.

The method provides crowd-sourced location information that may be used to aid an Indoor Positioning System (IPS) by using presumed locations of other devices in a given establishment or area. An application needing to use an IPS may add the described functionality to the software stack in the device that wants to be positioned.

The method may use a Lightweight Directory Access Protocol (LDAP) for accessing distributed directory information services over an Internet Protocol (IP) network for an enterprise or organization.

The advantage of the described method and system is that there is no need to deploy additional hardware to the establishment, it is not dependent on an existing wireless infrastructure, and it does not require calibration.

Figure 1A:
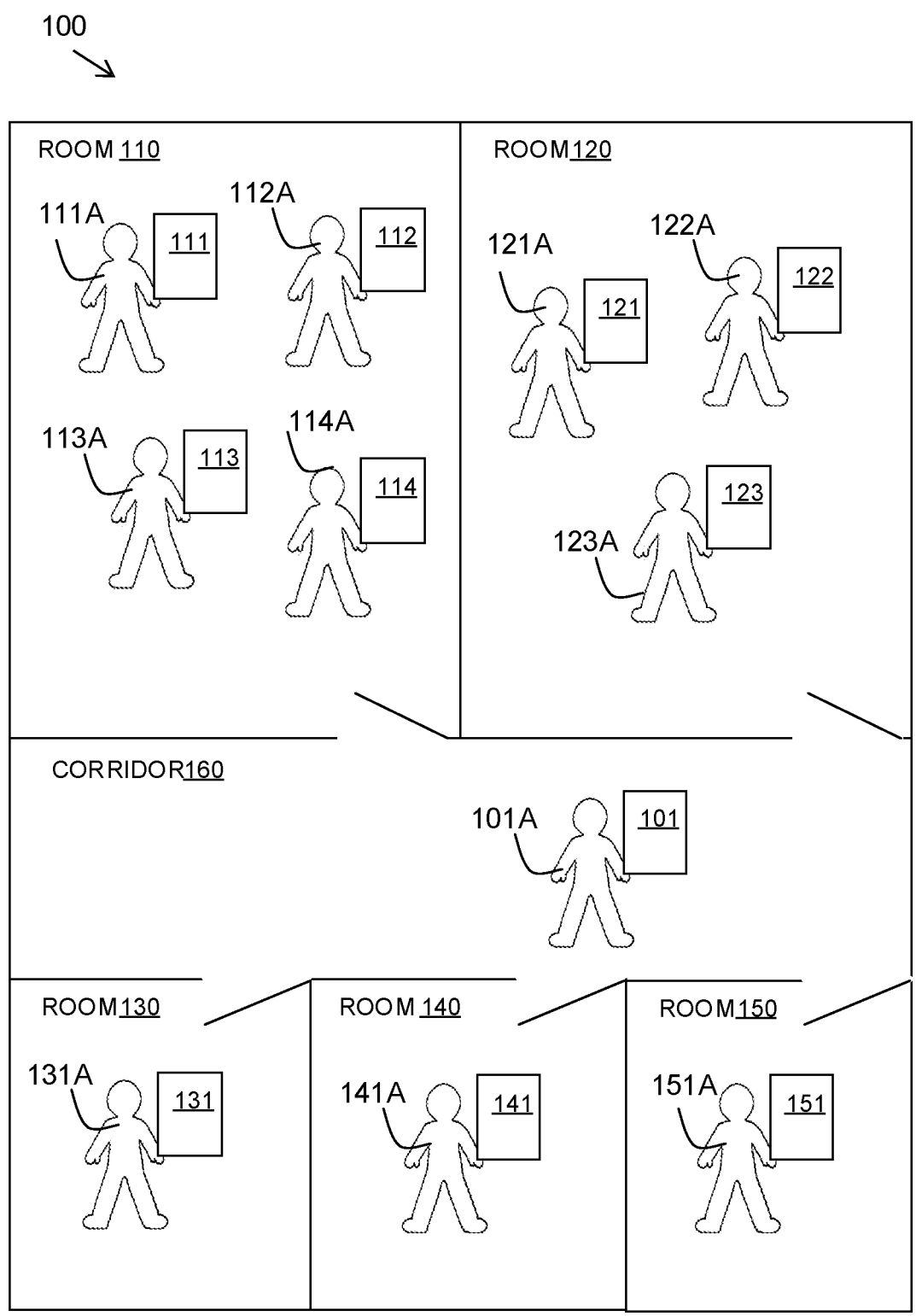
FIGS. 1A and 1B are schematic diagrams illustrating an example embodiment of the described invention.
Figure 1B:
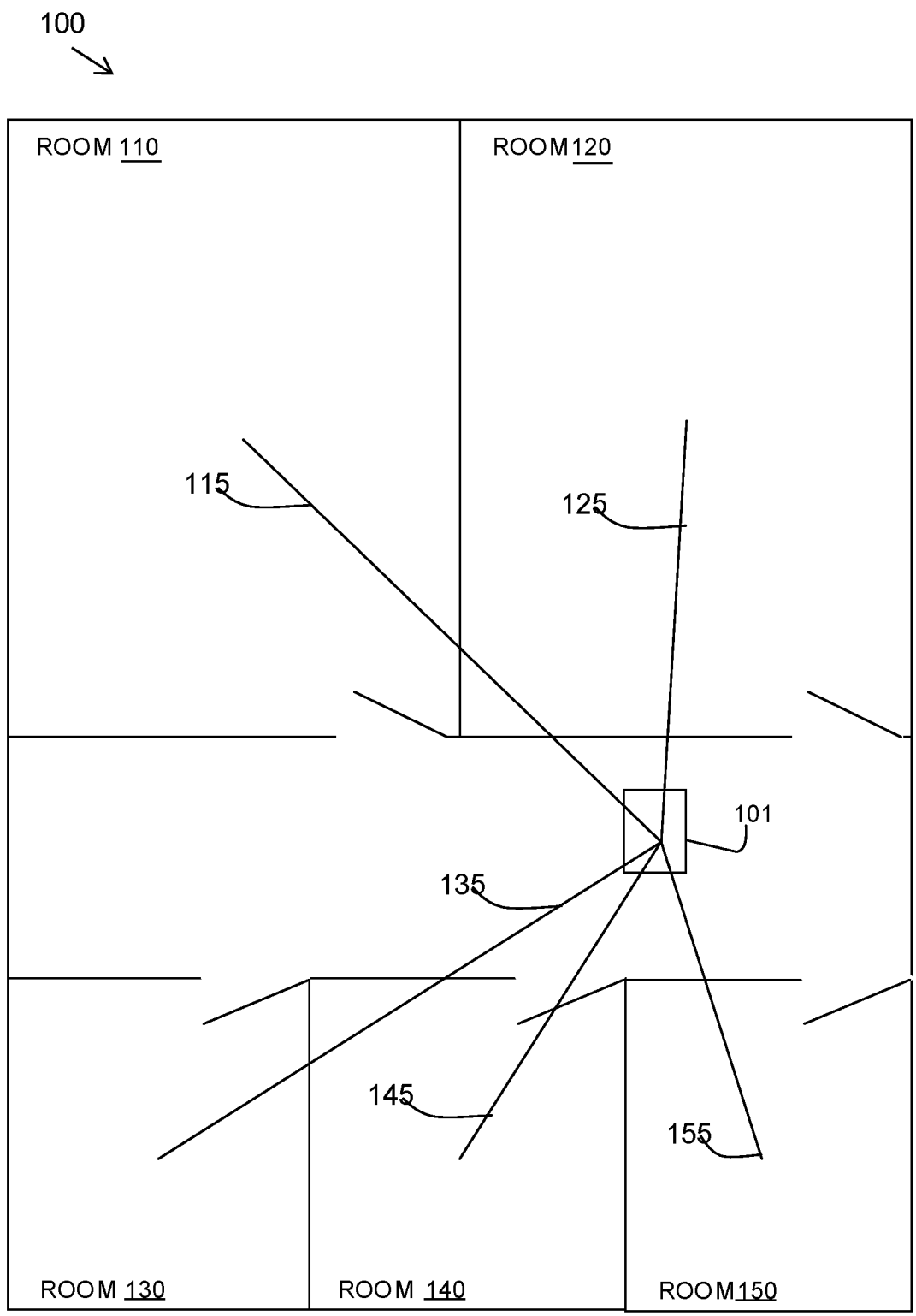

Referring to FIGS. 1A and 1B, schematic diagrams show an example embodiment of an establishment site 100 including multiple rooms 110, 120, 130, 140, 150 and a corridor 160.

A first user 101A has a first user mobile electronic device 101 and the first user 101A wishes to establish her location in the establishment. She may have a meeting in a room 110 and may be unsure of the room's location relative to her current position.

Second users 111A-114A, 121A-123A, 131A, 141A, 151A may be located in nearby rooms 110, 120, 130, 140, 150. These may be, for example, meeting rooms or open-plan workspaces 110, 120 in which multiple second users 111A-114A, 121A-123A are present, or individual workspaces 130, 140, 150 where one or two second user are present 131A, 141A, 151A.

As described further below, the first user 101A may use her mobile electronic device 101 to scan the surrounding area within a radius of her current location. The first user 101 who wishes to use the navigation functionality must access or download software onto her mobile electronic device 101 with permissions to scan for other user devices.

The scan may obtain a list of nearby second user mobile electronic devices with an identifier such as a media access control (MAC) address. The scan may be by a wireless technology standard such as WiFi or Bluetooth®.

The first user mobile electronic device 101 may access one or more resources of users that identifies second users of the second mobile electronic devices and provides a schedule of the expected locations of the second users in the establishment site. This may be carried out via a server, such as a central server of the establishment or a cloud server, or this may be carried out on the first user mobile electronic device 101 via scheduling functionality. The individuals, their schedule data, and the devices registered to the individuals may be provided by multiple databases and scheduling systems that already exist for users within an establishment.

As illustrated in FIG. 1B, the room locations of the second users may be obtained from the second users schedules and may be referenced to a site map of the establishment site. A geographical referencing method such as trilateration or triangulation may be used to determine the first user's location from distances 115, 125, 135, 145, 155 from each room 110, 120, 130, 140, 150 in which scanned second users are located.

Figure 2:
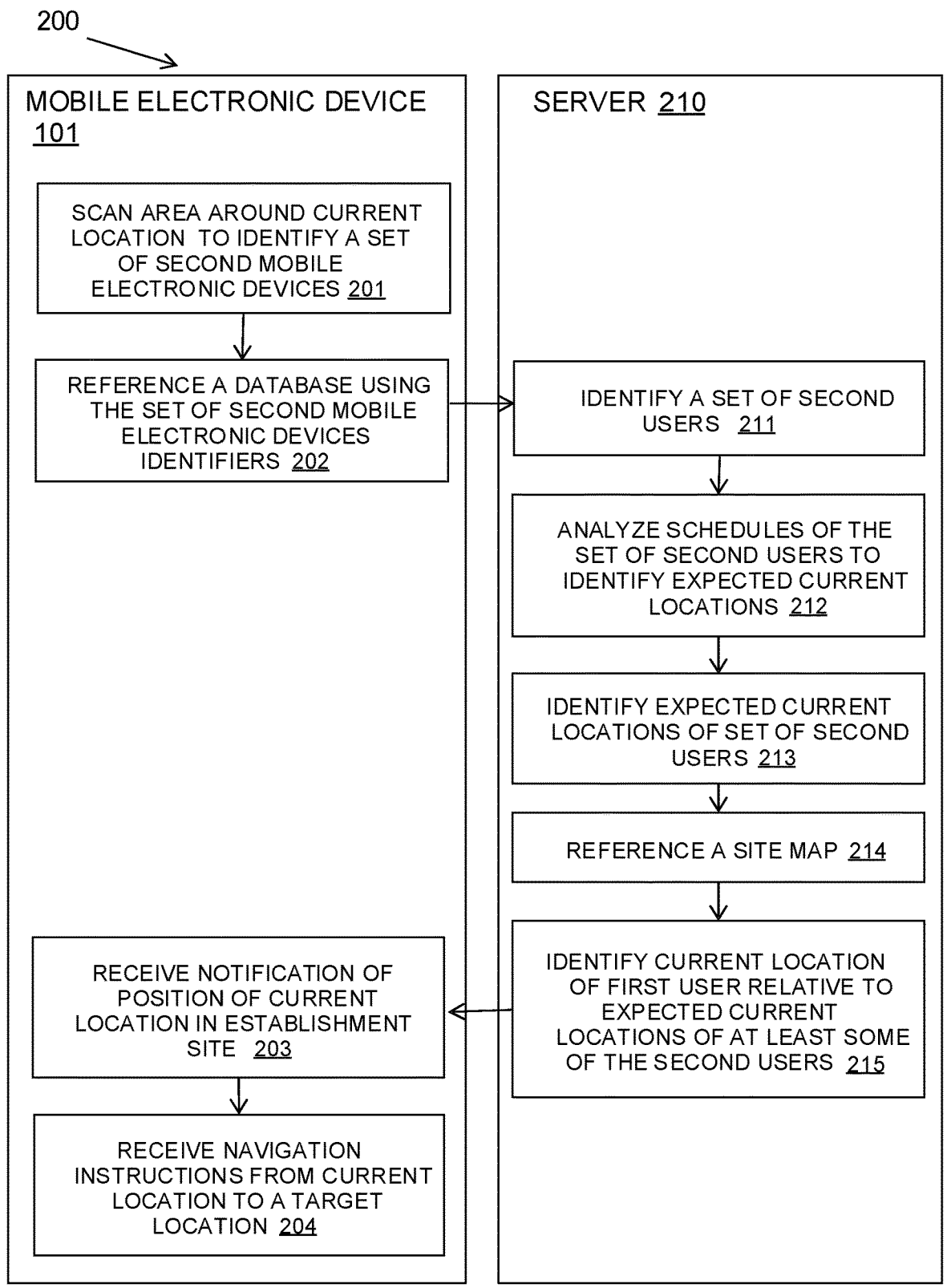
FIG. 2 is a swim-lane flow diagram of an example embodiment of a method in accordance with the present invention.

Referring to FIG. 2, a swim-lane flow diagram 200 shows an example embodiment of a method at a mobile electronic device 101 of a first user and a server 210. Some of the method steps shown on the server 210 may be carried out on a mobile electronic device 101.

The mobile electronic device 101 may scan 201 an area around the current location of the first user to identify a set of second mobile electronic devices. The method at the mobile electronic device 101 may reference 202 one or more resources using the set of second mobile electronic device identifiers.

The referencing 202 by the mobile electronic device 101 may access a database via a server 210 providing reference functionality. The server 210 may identify 211 a set of second users of the identified set of second mobile electronic devices from a register of users. The method may analyze 212 schedules of the set of second users to identify expected current locations of the second users and may identify 213 expected current locations of the set of second users. This may also be carried out via the server 210 or via scheduling functionality of the mobile electronic device 110.

Rules and statistics may be applied to identify an expected current location of a user. For example, there may be probabilities assigned to meeting participants to determine their likelihood of being physically at a scheduled location. Different factors may affect the probability, including whether the user is the room booker or an attendant. The booker may be given a slightly greater weight than the other attendants as those who book room are more likely to be physically present in a room.

A scheduling resource of a Lightweight Directory Access Protocol (LDAP) may be used for accessing distributed directory information services over an Internet Protocol (IP) network. The directory service may provide an organized set of records, such as an enterprise contacts directory. The LDAP may contain information about users' default office and scheduled meetings. This may be combined with information about the users' devices such as their MAC addresses.

Information about default site locations may also be used. If, for example, a user is not in a meeting, then he is expected to be in his default office address.

There are many other factors that can influence the probability of an individual being at a specific location.

The method at the server 210 may reference 214 a site map and may identify 215 a current location of the first user relative to the expected current locations of at least some of the second users. This may use a geographical referencing method such as trilateration or triangulation from known locations of the second users.

The server 210 may provide this information to the first user mobile electronic device 101 that receives 203 notification of the positions of the current location in the establishment site and may also receive 204 navigation instructions to navigate from the current location to a target location in the establishment site.

The LDAP may be used to initiate the described navigation method and may offer another source of verification once the use of the method is prominent.

The LDAP may be used to detect where the user navigating the site is. For example, if a first user Fred is walking around A block and detects a colleague Dan's signal, Fred may check with the LDAP where he is supposed to be right now. If the answer is A121, which is Dan's default office, then it adds to the probability that Fred is in A block. If the answer is D121, a meeting room with 12 people, then it adds to the probability that Fred is in D block. The D block location may be tested by checking if the devices of the other meeting attendees are also detected. The method may also create a probability score of "did Dan actually move from his desk to the meeting room for this meeting", to determine the likelihood that this is the location of Dan's device.

This may be carried out for tens of second users' devices for a first user, and a confidence score may be obtained of where the first user is. In the long term, the LDAP will not contribute as much weight to the confidence score as more users using the described installed device software. As more users install the device software, the method may detect the location directly from calendar or user data on the devices, without having to go through the LDAP and hardware MAC address lists in the backend.

Figure 3:
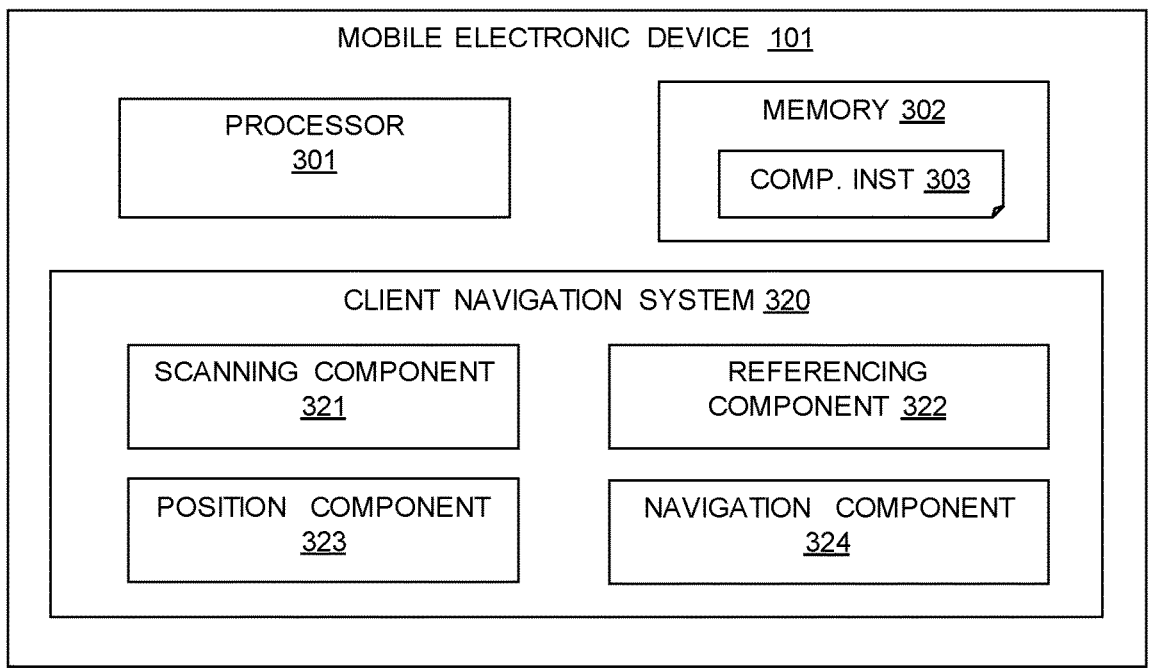
FIG. 3 is block diagram of an example embodiment of a system in accordance with the present invention.
Figure 3:
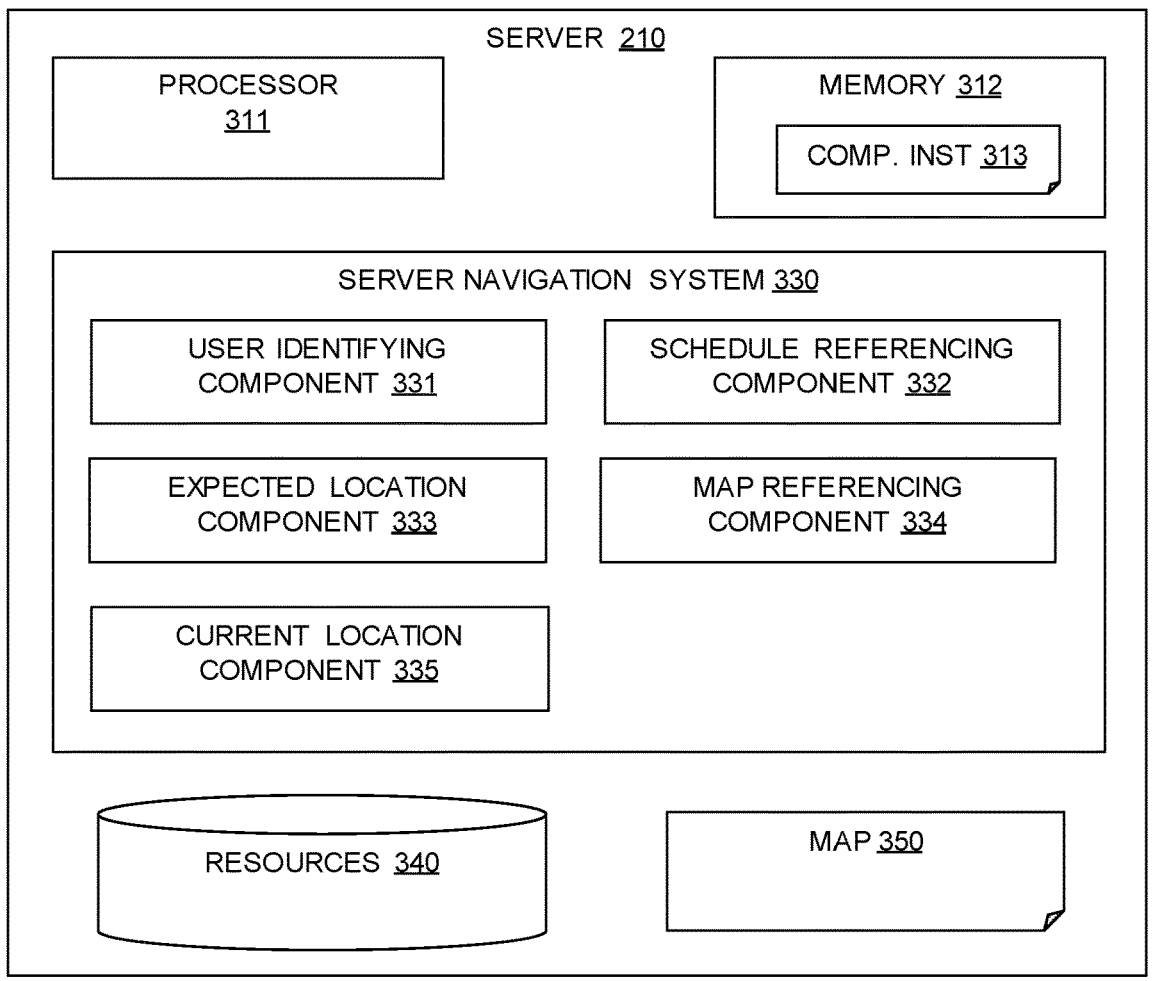

Referring to FIG. 3, a block diagram shows an example embodiment of a mobile electronic device 101 and a server 210 providing the described functionality.

The mobile electronic device 101 may be any form of identifiable electronic device that may be carried around by a user. This may be a smart phone, a tablet, a laptop computer, etc. The mobile electronic device 101 may include at least one processor 301, a hardware module, or a circuit for executing the functions of the described components which may be software units executing on the at least one processor. Memory 302 may be configured to provide computer instructions 303 to the at least one processor 301 to carry out the functionality of the components.

The mobile electronic device 101 may include a client navigation system 320 including a scanning component 321 for scanning an area around a current location of the first user to identify a set of second mobile electronic devices. The scanning component 321 may use a wireless technology standard scan and identifies media access control (MAC) addresses of other users' mobile electronic devices.

The client navigation system 320 may include a referencing component 322 for referencing one or more resources 340 via a server navigation system 330 for: identifying a set of second users for the set of second mobile electronic devices; analyzing schedules of the set of second users to identify expected current locations of each of the set of second users in an establishment site; and identifying the current location of the first user relative to the expected current locations of at least some of the set of second users by referencing a map of the establishment site. In one embodiment, the resources 340 may include an LDAP system.

The client navigation system 320 may also include a position component 323 for receiving notification of a position of the current location in the establishment site and a navigation component 324 for receiving navigation instructions from the current location to a target location in the establishment site.

The server 210 may include at least one processor 311, a hardware module, or a circuit for executing the functions of the described components which may be software units executing on the at least one processor. Multiple processors running parallel processing threads may be provided enabling parallel processing of some or all of the functions of the components. Memory 312 may be configured to provide computer instructions 313 to the at least one processor 311 to carry out the functionality of the components.

A server navigation system 330 may be provided at the server 210 in communication with the client navigation systems 320 of multiple users.

The server navigation system 330 may include a user identifying component 331 for identifying a set of second users for the set of second mobile electronic devices received from the client navigation system 320. This may reference a resource 340 mapping users to user devices.

The server navigation system 330 may include a schedule referencing component 332 for analyzing schedules of the set of second users provided via the resources 340 and an expected location component 333 for identifying expected current locations of each of the set of second users in an establishment site. The schedule referencing component 332 may reference the resources 340 that include schedules of registered users including a location directory of events with participants within the establishment site. The resources 340 may include LDAP resources.

The schedule referencing component 332 may include applying a default location for a second user if the second user has no scheduled event and applying probability rules to determine the probability of a second user being at a scheduled event.

The server navigation system 330 may include a current location component 335 for identifying the current location of the first user relative to the expected current locations of at least some of the set of second users by using a map referencing component 334 to reference a map 350 of the establishment site.

An example scenario is now described in a corporate site with access to a database of meetings happening in the site, the attendees, and the devices registered to those attendees. The method scans for nearby Bluetooth® and WiFi signals of other employees. If the method detects a set of devices of other employees, who are expected to be meeting in a specific location at this time, then the device may infer that it is near that location. With this information extrapolated to several events happening on site, the device may position itself.

A user of the method wants to know what room area he is in, in order to inform a colleague. The method scans the location and detects several other devices in the vicinity (e.g. smartphones, laptops). The method records the MAC addresses of the devices to identify them. The method retrieves the owner information of those other devices and the schedule information of these owners, giving an expected location.

The method identifies the nearby devices belong to three people who are currently scheduled to be in room G201. It is therefore highly likely that the location of these devices is room G201.

The method may verify that this MAC address is where it is supposed to be by cross checking with other MAC addresses it has detected. If it detects the MAC address of three out of five participants of a specific meeting, then it will be more confident that they are actually meeting together in the same room than if it were to only detect one out of five participants.

The more devices in the vicinity with a presumed location attached (desk number, cashier location, meeting room, etc.) the more confidence the method may have on it's determined location.

Using multiple locations of owners of the devices, the location of the user can be trilaterated, triangulated or calculated by another geometric means and the user's location is pinpointed on the map of the site.

Figure 4:
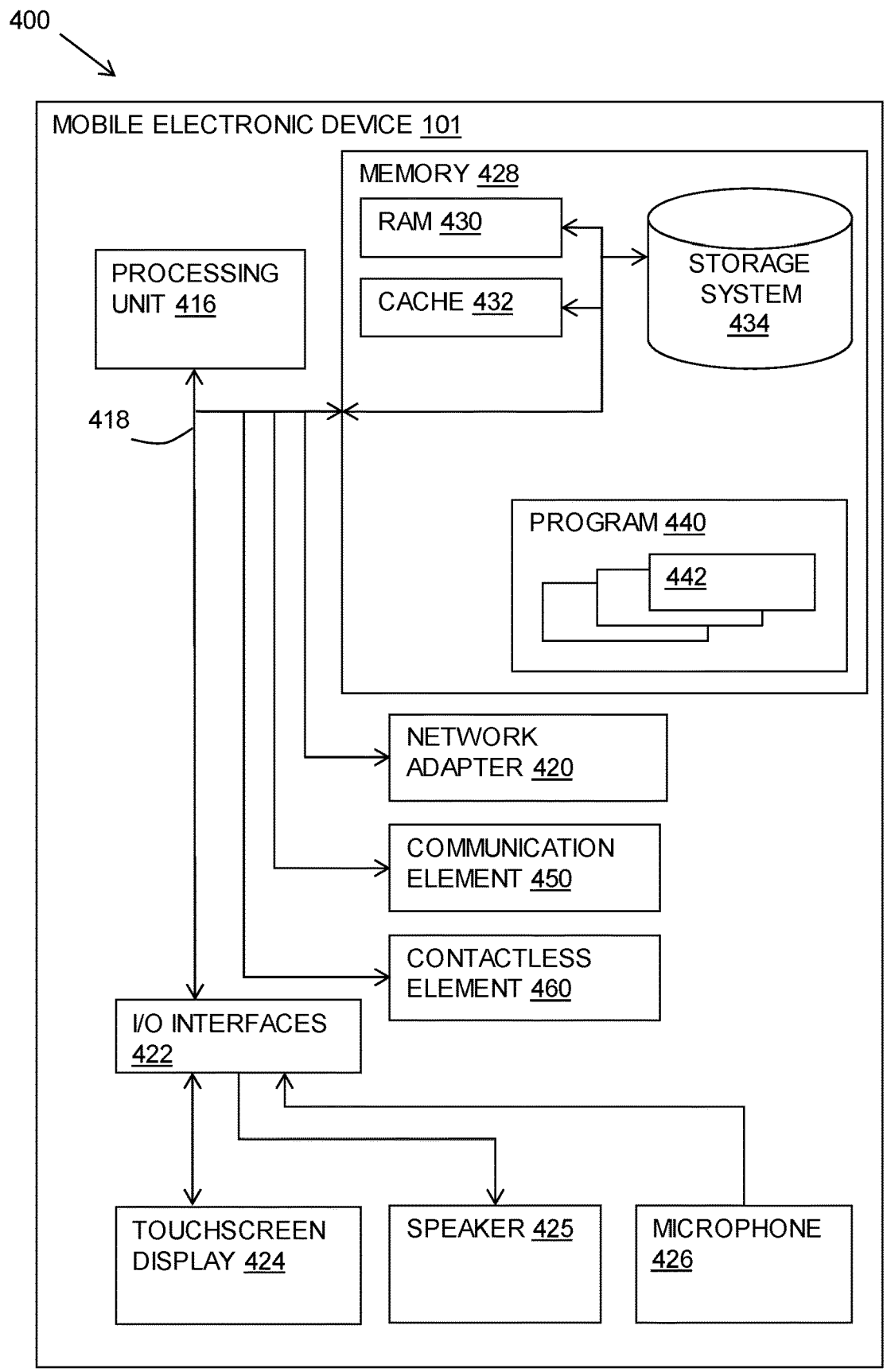
FIG. 4 is a block diagram of an embodiment of a mobile electronic device in which the present invention may be implemented.

FIG. 4 shows a block diagram of a mobile electronic device 101 that may be used in embodiments of the disclosure. The mobile electronic device 101 may be a smart phone, a satellite phone, a tablet or a mobile computing device.

The mobile electronic device 101 may include a processor 405 (e.g., a microprocessor) for processing the functions of the mobile electronic device 101 and a display 420 to allow a user to see the phone numbers and other information and messages. The mobile electronic device 101 may further include an input element 425 to allow a user to input information into the device (e.g., input buttons, touch screen, etc.), a speaker 430 to allow the user to hear voice communication, music, etc., and a microphone 435 to allow the user to transmit his or her voice through the mobile electronic device 101.

The processor 410 of the mobile electronic device 101 may connect to a memory 415. The memory 415 may be in the form of a computer-readable medium that stores data and, optionally, computer-executable instructions.

The mobile electronic device 101 may also include a communication element 440 for connection to communication channels (e.g., a cellular telephone network, data transmission network, Wi-Fi® network, satellite-phone network, Internet network, Satellite Internet Network, etc.). The communication element 440 may include an associated wireless transfer element, such as an antenna.

The communication element 440 may include a subscriber identity module (SIM) in the form of an integrated circuit that stores an international mobile subscriber identity and the related key used to identify and authenticate a subscriber using the mobile electronic device 101. One or more subscriber identity modules may be removable from the mobile electronic device 101 or embedded in the mobile electronic device 101.

The mobile electronic device 101 may further include a contactless element 450, which is typically implemented in the form of a semiconductor chip (or other data storage element) with an associated wireless transfer element, such as an antenna. The contactless element 450 may be associated with (e.g., embedded within) the mobile electronic device 101 and data or control instructions transmitted via a cellular network may be applied to the contactless element 450 by means of a contactless element interface (not shown). The contactless element interface may function to permit the exchange of data and/or control instructions between mobile electronic device circuitry (and hence the cellular network) and the contactless element 450.

The contactless element 450 may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth®, infra-red, or other data transfer capability that can be used to exchange data between the mobile electronic device 101 and an interrogation device. Thus, the mobile electronic device 101 may be capable of communicating and transferring data and/or control instructions via both a cellular network and near field communications capability.

Figure 5:
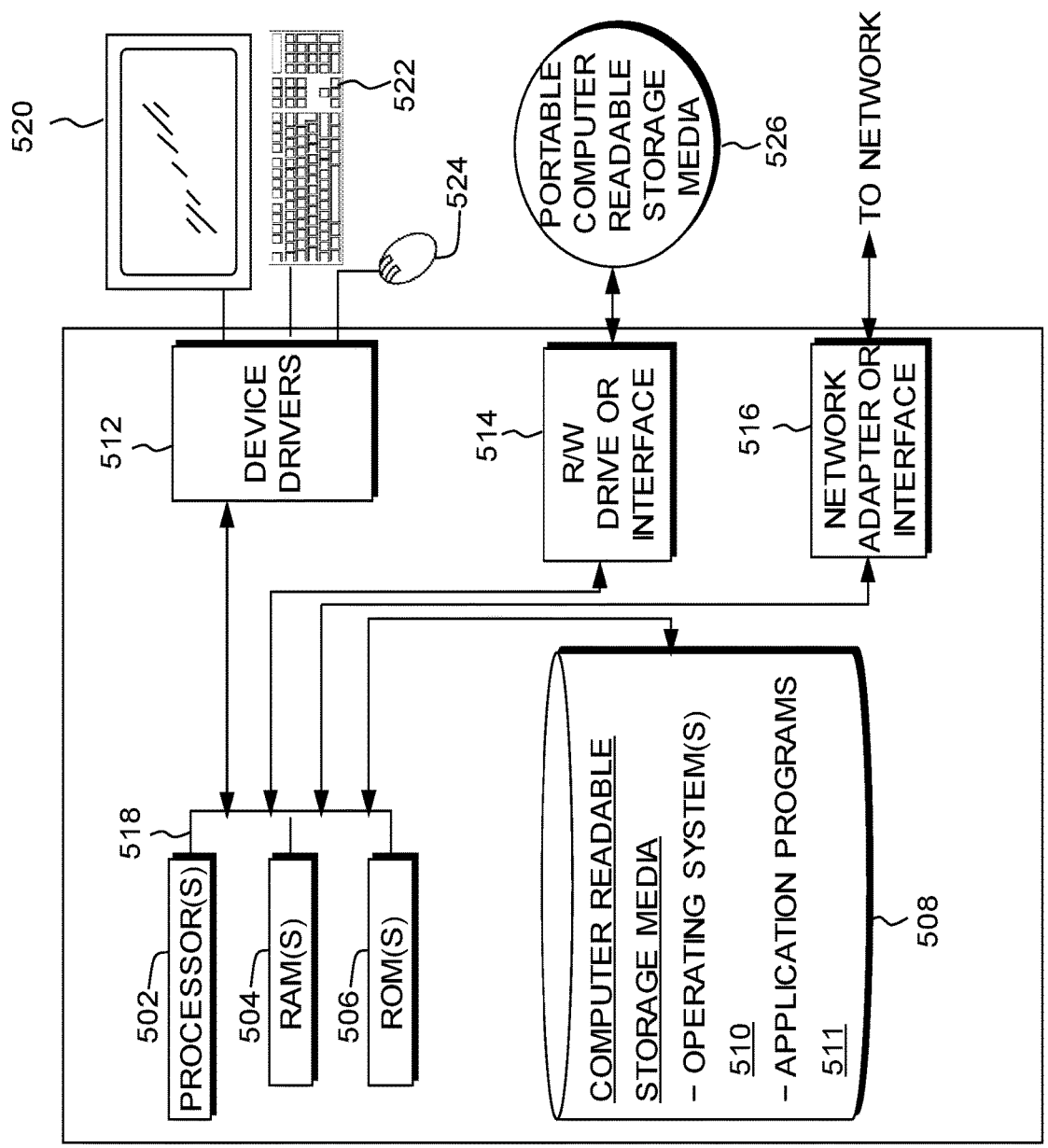
FIG. 5 is a block diagram of an embodiment of a computer system or cloud server in which the present invention may be implemented.

FIG. 5 depicts a block diagram of components of a computing device that may be provided in the form of the mobile electronic device 101 or the server 210 in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device can include one or more processors 502, one or more computer-readable RAMs 504, one or more computer-readable ROMs 506, one or more computer readable storage media 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within the system.

One or more operating systems 510, and application programs 511, are stored on one or more of the computer readable storage media 508 for execution by one or more of the processors 502 via one or more of the respective RAMs 504 (which typically include cache memory). In the illustrated embodiment, each of the computer readable storage media 508 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device can also include a R/W drive or interface 514 to read from and write to one or more portable computer readable storage media 526. Application programs 511 on computing device can be stored on one or more of the portable computer readable storage media 526, read via the respective R/W drive or interface 514 and loaded into the respective computer readable storage media 508.

Computing device can also include a network adapter or interface 516, such as a TCP/IP adapter card or wireless communication adapter. Application programs 511 on computing device can be downloaded to the computing device from an external computer or external storage device via a network (for example, the Internet, a local area network or other wide area networks or wireless networks) and network adapter or interface 516. From the network adapter or interface 516, the programs may be loaded into the computer readable storage media 508. The network may comprise copper wires, optical fibers, wireless transmission, routers, firewalls, switches, gateway computers and edge servers.

Computing device can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514, and network adapter or interface 516 can comprise hardware and software stored in computer readable storage media 508 and/or ROM 506.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
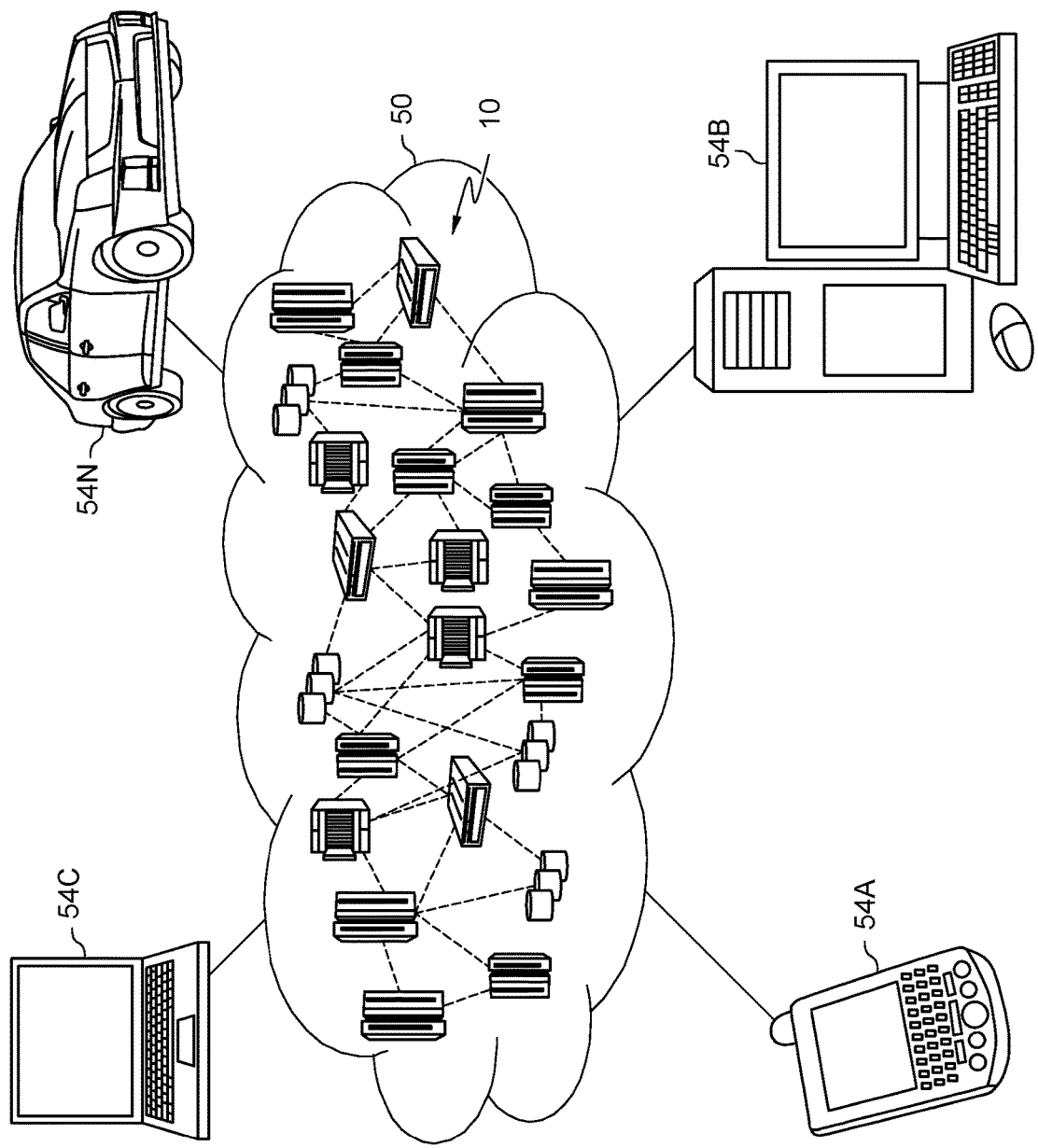
FIG. 6 is a schematic diagram of a cloud computing environment in which the present invention may be implemented.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
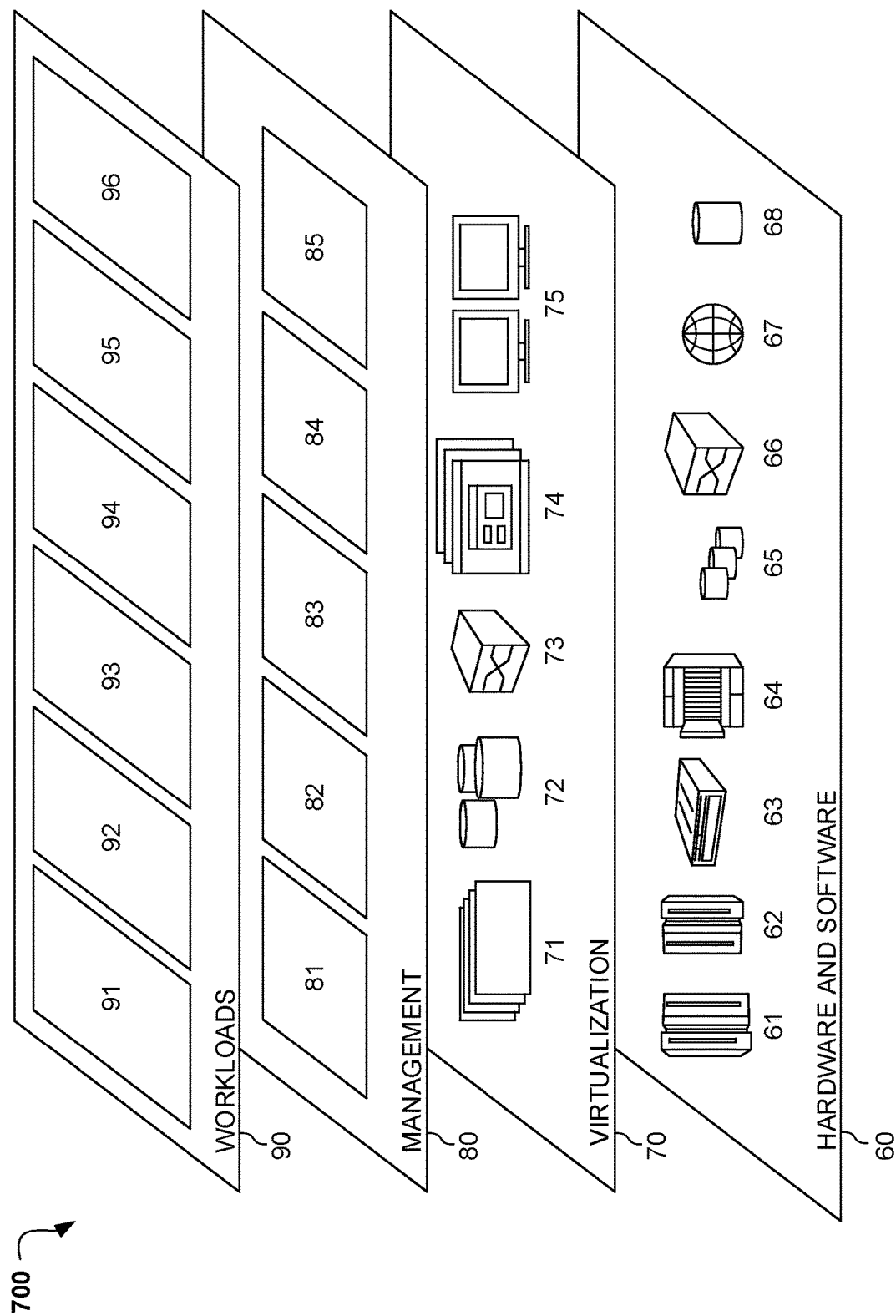
FIG. 7 is a diagram of abstraction model layers of a cloud computing environment in which the present invention may be implemented.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and navigation processing 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for navigation in an establishment site for a first user using a first mobile electronic device by carrying out a method at the first mobile electronic device comprising:
   scanning, by the first mobile electronic device, an area around a current location of the first user to identify a set of second mobile electronic devices, wherein the first mobile electronic includes a processor, a memory, and a navigation system having a scanning component;
   referencing, by the processor, one or more resources for:
     identifying a set of second users for the set of second mobile electronic devices;
     analyzing schedules of the set of second users to identify expected current locations of each of the set of second users in an establishment site; and
     identifying the current location of the first user relative to the expected current locations of at least some of the set of second users by referencing a map of the establishment site; and
   receiving, by the processor, notification of a position of the current location in the establishment site from a server.

2. The method of claim 1, further comprising:
   including receiving navigation instructions from the current location to a target location in the establishment site.

3. The method of claim 2, wherein the target location is determined from a scheduling resource.

4. The method of claim 1, wherein identifying the current location of the first user relative to the expected current locations of at least some of the set of second users by referencing a map of the establishment site, applies trilateration or triangulation from three or more locations of second users in the establishment site.

5. The method of claim 1, wherein the one or more resources includes schedules of registered users including a location directory of events with participants within the establishment site.

6. The method of claim 5, wherein analyzing the one or more resources includes applying a default location for a second user if the second user has no scheduled event.

7. The method of claim 5, wherein analyzing the one or more resources includes statistical analysis to identify a most likely expected location of a second user.

8. The method of claim 5, wherein analyzing the one or more resources includes identifying an expected current location of a sub-set of the second users scheduled to be at a location of an event by increasing an accuracy probability of second users' expected current locations based on an identified grouping of the sub-set of the second users in the scanning.

9. The method of claim 1, further comprising:
   downloading, by the processor, an application to the first mobile electronic device to obtain permissions to scan for other users' mobile electronic devices.

10. The method of claim 1, wherein the scanning uses a wireless technology standard scan and identifies media access control (MAC) addresses of other users' mobile electronic devices.

11. The method of claim 1, further comprising:
    a method at a remote server comprising:
      receiving, by a processor, a request from the first mobile electronic device including the set of second mobile electronic device identifiers; and
      carrying, by the processor, out the referencing the one or more resources to:
        identify a set of second users for the set of second mobile electronic devices;
        analyze schedules of the set of second users to identify expected current locations of each of the set of second users in an establishment site; and
        identify the current location of the first user relative to the expected current locations of at least some of the set of second users by referencing a map of the establishment site.

12. The method of claim 1, further comprising:
    providing an application to the first mobile electronic device of the first user to carry out scanning of the area around the current location of the first user to identify the set of second mobile electronic devices;
    identifying the set of second users for the set of second mobile electronic devices from a resource;
    analyzing schedules of the set of second users from the scheduling resource to identify the expected current locations of each of the set of second users in the establishment site;

identifying the current location of the first user relative to the expected current locations of at least some of the set of second users by referencing the map of the establishment site; and providing notification of the position of the current location in the establishment site.

13. A system for navigation in an establishment site for a first user using a first mobile electronic device, the first mobile electronic device comprising:
- a processor and a memory configured to provide computer program instructions to the processor to execute the function of components, the components comprising:
- a scanning component for scanning an area around a current location of the first user to identify a set of second mobile electronic devices;
- a referencing component for referencing one or more resources for:
  - identifying a set of second users for the set of second mobile electronic devices;
  - analyzing schedules of the set of second users to identify expected current locations of each of the set of second users in an establishment site; and
  - identifying the current location of the first user relative to the expected current locations of at least some of the set of second users by referencing a map of the establishment site; and
- a position component for receiving notification of a position of the current location in the establishment site from a server.

14. The system of claim 13, further comprising:
a navigation component for receiving navigation instructions from the current location to a target location in the establishment site.

15. The system of claim 13, wherein the scanning component uses a wireless technology standard scan and identifies media access control (MAC) addresses of other users' mobile electronic devices.

16. The system of claim 15, wherein the wireless technology standard is Wi-Fi® or Bluetooth®.

17. The system of claim 13, further comprising:
a server comprising:
- a user identifying component for identifying a set of second users for the set of second mobile electronic devices;
- a schedule referencing component for analyzing schedules of the set of second users to identify expected current locations of each of the set of second users in an establishment site; and
- a current location component for identifying the current location of the first user relative to the expected current locations of at least some of the set of second users by referencing a map of the establishment site.

18. The system of claim 17, wherein the current location component applies trilateration or triangulation from three or more locations of second users in the establishment site.

19. The system of claim 17, wherein the database includes schedules of registered users including a location directory of events with participants within the establishment site.

20. A computer program product for navigation in an establishment site for a first user using a first mobile electronic device, the computer program product comprising a computer readable storage medium having program instructions embodied therewith, the program instructions executable by a processor to cause the processor to:
- scan, by the first mobile electronic device, an area around a current location of the first user to identify a set of second mobile electronic devices wherein the first mobile electronic includes a processor, a memory, and a navigation system having a scanning component;
- reference one or more resources for:
  - identifying a set of second users for each of the set of second mobile electronic devices;
  - analyzing schedules of the set of second users to identify expected current locations of each of the set of second users in an establishment site; and
  - identifying the current location of the first user relative to the expected current locations of at least some of the set of second users by referencing a map of the establishment site; and
- receive notification of a position of the current location in the establishment site from a server.

* * * * *